B. ELSHOFF.
DYNAMO ELECTRIC MACHINE.
APPLICATION FILED JUNE 30, 1906.
911,708.
Patented Feb. 9, 1909.
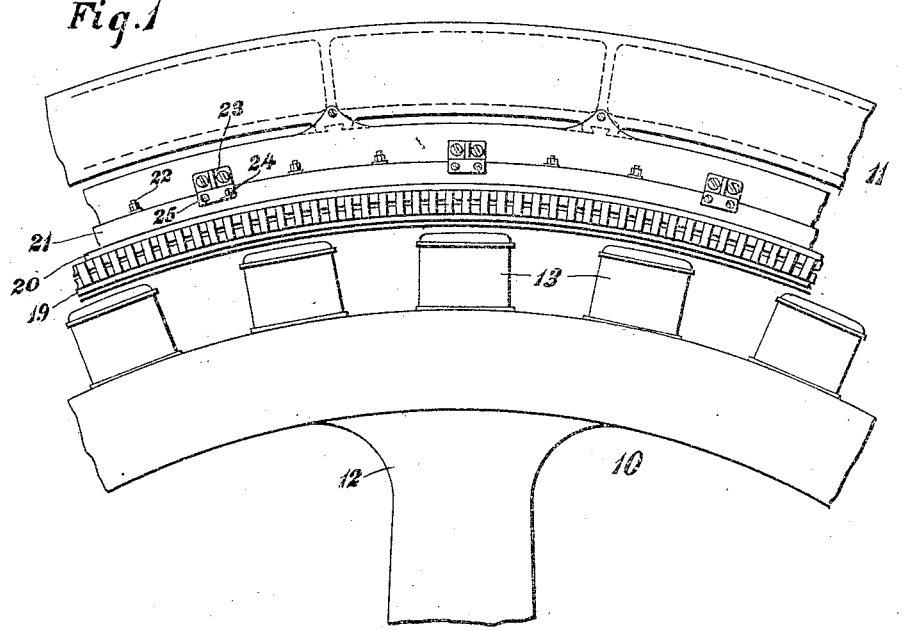
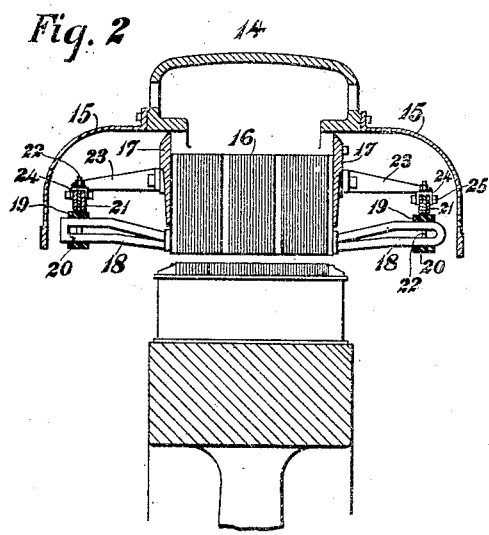
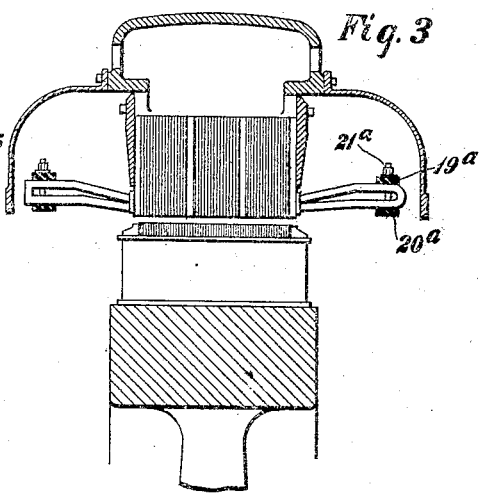
WITNESSES
INVENTOR
Bernard Elshoff
BY
Chas. E. Lord
ATTORNEY

UNITED STATES PATENT OFFICE.

BERNARD ELSHOFF, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 911,708.      Specification of Letters Patent.      Patented Feb. 9, 1909.

Application filed June 30, 1906. Serial No. 324,127.

*To all whom it may concern:*

Be it known that I, BERNARD ELSHOFF, citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines and particularly to the means for supporting and bracing the end-turns of the stator coils.

In large dynamo-electric machines such as alternating current generators and motors, the end-turns of the stator coils extend outward a considerable distance on each side of the stator cores. When the machines are in operation, especially when under heavy loads the end-turns of the coils if unsupported or unbraced are subject to constant and severe vibration, which, if allowed to continue for a considerable time, destroys the insulation, causing the windings to be burned out. Furthermore, should a heavily loaded generator be accidentally short-circuited, the end-turn of the stator coils if unsupported are distorted and twisted out of position probably due to the actions of the magnetic fields surrounding the end-turns.
One of the objects of my invention is to provide an improved means for supporting the end-turns or end-connections of the conductors of dynamo-electric machines particularly the end-turns of stator coils so that they are held firmly in position, and the vibration, and danger of distortion in case of short-circuit, are entirely eliminated.

A further object is to provide for the end-turns improved supporting and bracing means which is effective, but cheap in construction, easily applied to the machines, and easily removed in case repairs are necessary.

In carrying out my invention I provide two concentric rings, one surrounding the end-turns of the conductors and the other within the end-turns and draw the rings tightly against the end-turns by some means such as bolts, extending between the rings.
More specifically considered my invention consists of a stator core having conductors extending beyond the core, means for supporting and bracing the projecting portions of the conductors comprising concentric rings drawn together into firm engagement with the conductors, and brackets supporting the rings.

My invention still further consists in certain novel details of construction, the combinations, and arrangements of parts described in the specification and set forth in the appended claims.

For a better understanding of my invention, reference is had to the accompanying drawings, in which—

Figure 1 is a sectional side elevation of a portion of a dynamo-electric machine equipped with my invention; Fig. 2 is a transverse section through the same; and Fig. 3 is a similar view of a slight modification.

Referring now to the figures of the drawings, I have shown at 10 a portion of the rotary field spider and at 11 a portion of the armature of an alternating current generator. I wish it to be understood however, that my invention is not limited to dynamo-electric machines of this type. The rotor consists of a spider 12 having radial poles 13. The armature comprises a frame 14 having end-heads 15 and a core 16 held between end-heads 17. Located in the slots of the core are the usual armature coils having end-turns or end connections 18.

The parts so far described are of the usual construction and form no part of my invention.

Surrounding and in engagement with the end-turns at each end of the machine is an insulating ring 19 and located within the end-turns and concentric with each outer ring 19 is a second insulating ring 20. Both of these rings may consist of sections, the number of which depends on the size of the machine. In the preferred form of my invention as shown in Figs. 1 and 2 the rings 19 are each surrounded by a laminated wooden ring 21. The rings 19, 20 and 21 at each end of the machine are drawn together by bolts 22 which pass between the conductors through all said rings. Thus the end-turns are tightly clamped between the rings 19 and 20. Extending outward from the ends of the stator are a number of spaced brackets 23 having inwardly extending jaws 24 into which the wooden rings are seated. The rings are secured to the brackets by bolts 25 passing through the jaws and the outer wooden rings. With this construction the end-turns are firmly held in position and there can be practically no vibration or displacement of the end-turns.

In all cases it is not necessary to support the rings between which the end-turns are clamped, by brackets. In Fig. 3 is shown a construction in which the brackets are not employed. In this case the end-turns are held in position solely by inner and outer insulating rings 19$^a$ and 20$^a$ and clamping bolts 21$^a$, which as in the preceding case pass through the rings clamping the end-turns tightly in position.

I do not wish to be confined to the exact details shown as many changes can be made without involving a departure from the spirit and scope of my invention.

What I claim as new and desire to secure by Letters Patent is:—

1. In a dynamo-electric machine, a stator core, conductors projecting therefrom, an outer bracing ring formed of insulating material surrounding the conductors and spaced from the core, an inner bracing ring formed of insulating material concentric with the first named ring and also spaced from the core, and means extending between the two rings for drawing them together, one of said rings having sufficient flexibility to permit its being drawn inward against the conductors at a number of point but having sufficient inherent rigidity to firmly support and brace the conductors.

2. In a dynamo-electric machine, an annular stator core, conductors mounted in the slots of the core and projecting from the side thereof, a bracing ring of insulating material surrounding the projecting portions of the conductors, a bracing ring of flexible insulating material engaging the inner edges of the projecting portions of the conductors, and means extending between the conductors from one ring to another for drawing the rings tightly against the conductors at a number of points, said rings being spaced from the core and having sufficient inherent rigidity to firmly support and brace the conductors.

3. In a dynamo-electric machine, an annular stator core, conductors mounted in the slots of the core and projecting from each side thereof, and means on each side of the core for supporting the projecting portions of the conductors comprising an outer ring of insulating material surrounding the conductors, an inner ring of insulating material concentric with the outer ring and bearing against the inner edges of the conductors, and means for clamping said rings firmly against the conductors comprising a plurality of bolts extending between the rings at a number of points, said rings being spaced from the core and having sufficient inherent rigidity or stiffness to firmly brace and support the conductors.

4. In a dynamo-electric machine, a stationary member comprising a core, conductors in the slots of the core and having portions projecting from the side thereof, an outer ring of insulating material surrounding the projecting portions of the conductors, a ring of flexible insulating material within the conductors and concentric with the outer ring, means extending between the rings for drawing the latter against the conductors, and brackets for supporting the rings, said rings having sufficient inherent strength and stiffness to firmly brace the conductors.

5. In a dynamo-electric machine, a stationary member comprising a core, conductors in the slots of the core and having portions projecting beyond the same, an outer ring of insulating material surrounding the projecting portions of the conductors, an inner ring of flexible insulating material engaging the inner edges of the conductors, a plurality of bolts extending between the rings for drawing the latter against the conductors at a number of points, and brackets supporting the rings, said rings bracing the conductors by their inherent strength and rigidity.

6. In a dynamo-electric machine, a stator, means for supporting the ends of the stator coils, comprising an insulating ring within the coils, an insulating ring surrounding the coils, and a third wooden ring surrounding the second named ring, all said rings being concentrically arranged and drawn firmly together by bolts passing between the coils and through the rings.

7. In a dynamo-electric machine, a stator, means for supporting the stator coils at each end of the machine comprising three concentric rings, the inner ring being of insulating material and engaging the inner edges of the conductors, the second ring being likewise of insulating material and surrounding the conductors and the outer ring being heavier than the first two rings and formed of parallel wooden sections, all said rings being tightly drawn together by radial bolts passing through the same, and a plurality of supporting brackets extending outward from the frame of the machine and engaging the outer wooden ring.

In testimony whereof I affix my signature, in the presence of two witnesses.

BERNARD ELSHOFF.

Witnesses:
   Geo. B. Schley,
   Fred J. Kinsey.